N. C. WIETING & W. F. WATERS.
CHURN MOTORS.
No. 182,252. Patented Sept. 12, 1876.
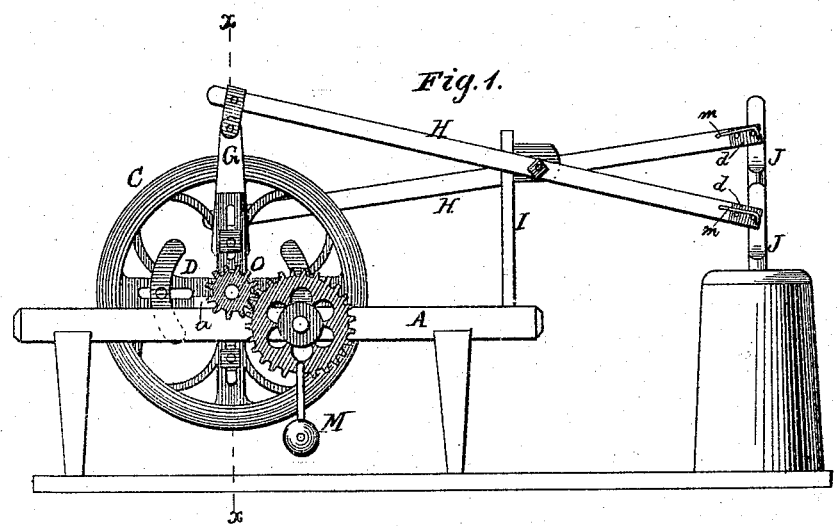
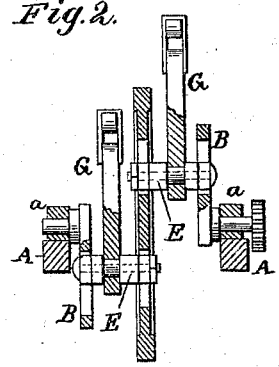
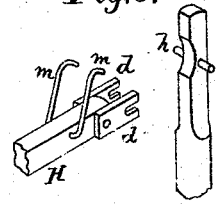
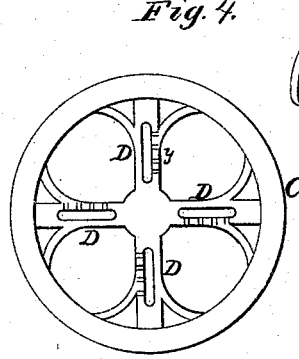
WITNESSES
Henry N. Miller
F. L. Durand
INVENTOR
N. C. Wieting
W. F. Waters,
By Alexander Mason
Attorneys

UNITED STATES PATENT OFFICE.

NATHAN C. WIETING AND WALSWORTH F. WATERS, OF TOLEDO, IOWA.

IMPROVEMENT IN CHURN-MOTORS.

Specification forming part of Letters Patent No. 182,252, dated September 12, 1876; application filed July 12, 1876.

*To all whom it may concern:*

Be it known that we, N. C. WIETING and W. F. WATERS, of Toledo, in the county of Tama and in the State of Iowa, have invented certain new and useful Improvements in Churns; and do hereby declare that the following is a full, clear, and exact description thereof, reference being had to the accompanying drawings, and to the letters of reference marked thereon, making a part of this specification.

The nature of our invention consists in the construction and arrangement of a power for operating churns, and other light machinery, as will be hereinafter more fully set forth.

In order to enable others skilled in the art to which our invention appertains to make and use the same, we will now proceed to describe its construction and operation, referring to the annexed drawing, in which—

Figure 1 is a side elevation of our machine, and Figs. 2, 3, 4, and 5 are detached views of parts thereof.

A represents the frame of our machine, upon which, in suitable boxes $a\ a$, are placed two crank-arms, B B, which are slotted longitudinally, as shown. C represents the fly-wheel provided with slotted spokes D, which are made to serve as part of the crank, and are connected to the slotted arms B by means of adjustable chuck-blocks E E, constructed as shown in Fig. 3, with tenons at the ends to fit in the slots, and a bolt, $p$, is then passed through the parts, and fastened by a nut. The center of each chuck-block is turned round, and a pitman, G, is placed thereon.

The two pitmen G G are connected to two levers, H H, which are pivoted to a standard, I, and to the other ends may be attached churn-dashers J J, or other light machinery that is to operate up and down.

It will be noticed that upon each side of the fly-wheel is one crank-connection, thus forming two cranks or a double crank, the fly-wheel forming a part of each crank, whereby the momentum of the fly-wheel is equally distributed without strain on the working parts and perfect uniformity preserved.

The circular sweep of the crank may be increased or decreased by the movability of the pitman-journal or adjustable chuck-block, which can be done by simply loosening the nuts on the bolts $p$. The fly-wheel is not supported upon any center shaft or stud.

Notches are cast in the arms of the cranks, as shown at $x$ in Fig. 3, and corresponding notches $y$ in the spokes of the wheel C, in which fit projections $z$ on the chuck-blocks E, to preserve uniformity in moving the same, and assist in holding the parts securely.

This simple mechanism enables the parts to be changed with speed and ease, and adjusted with accuracy and firmness.

When heavy work is to be done, the fly-wheel C is provided with movable bars or flies L arranged in pairs, one on each side of the spoke, and fastened by bolts $b$ at any distance desired from the center. These flies have projections $i$ to fit in the notches $y$ on the spokes, so that they may be held firmly in their places.

The object of these movable flies is to increase the power of the fly-wheel, and to adjust that increase of power to the required wants, by moving said flies to or from the center of the wheel.

This power is specially intended for operating a churn or a clothes-pounder; but it is equally applicable to other machinery requiring the same motion.

The dasher-rods J are connected to the ends of the levers by the following means: On the end of each lever H are two projecting plates, $d\ d$, the outer ends of which are slotted, as shown in Fig. 5, and are placed over projecting pins $h\ h$ in the rod J. Hooks $m\ m$ fastened in the lever are then brought down over the pins, holding the parts together.

The ends of the levers H are rounded, and bear in concave recesses on the rods, so that there will be no binding between them, but the rods will be made to work freely.

The machine is driven by means of a crank, M, provided with gearing, and a pinion, O, on one of the crank-journals.

Having thus fully described our invention, what we claim as new, and desire to secure by Letters Patent, is—

1. The combination, with the levers H H, and pitmen G G, the fly-wheel C, having longitudinally-slotted spokes, the longitudinally-slotted crank-arms B B, and the adjustable chuck-blocks E E connecting the pitmen, crank-arms, and fly-wheel, by means of the bolts $p$, all constructed substantially as and for the purposes herein set forth.

2. The levers H, slotted plates $d$, hooks $m$, and rods J, with pins $h$, in combination with the fly-wheel, pitmen, adjustable chuck-blocks, and slotted crank-arms, all constructed substantially as and for the purposes herein set forth.

In testimony that we claim the foregoing we have hereunto set our hands this 3d day of June, 1876.

NATHAN C. WIETING.
WALSWORTH F. WATERS.

Witnesses:
JAMES W. STEWART,
H. S. BRADSHAW.